(12) United States Patent
Henschel et al.

(10) Patent No.: US 7,299,675 B2
(45) Date of Patent: Nov. 27, 2007

(54) FUEL LEVEL SENSOR CALIBRATION

(75) Inventors: Matthias Henschel, Rheinmuenster (DE); Peter Schreuder, Kevelaer (DE)

(73) Assignee: TI Automotive (Neuss) GmbH, Neuss (DE)

( * ) Notice: Subject to any disclaimer, the term of this patent is extended or adjusted under 35 U.S.C. 154(b) by 0 days.

(21) Appl. No.: 11/311,953

(22) Filed: Dec. 20, 2005

(65) Prior Publication Data

US 2006/0137429 A1 Jun. 29, 2006

(30) Foreign Application Priority Data

Dec. 23, 2004 (DE) .................... 10 2004 062 100

(51) Int. Cl.
*G01F 25/00* (2006.01)
(52) U.S. Cl. .......................... 73/1.17; 73/1.73
(58) Field of Classification Search ................ 73/1.73, 73/314, 1.17, 313, 315, 317, 319; 116/228, 116/229, 227; 222/51; 33/719
See application file for complete search history.

(56) References Cited

U.S. PATENT DOCUMENTS

| | | | |
|---|---|---|---|
| 5,485,740 A | 1/1996 | Lippmann et al. | 73/1.73 |
| 5,636,548 A * | 6/1997 | Dunn et al. | 73/313 |
| 6,597,998 B1 * | 7/2003 | Gonring | 702/55 |
| 2005/0247128 A1 * | 11/2005 | Fukuhara et al. | 73/313 |

* cited by examiner

*Primary Examiner*—Hezron Williams
*Assistant Examiner*—Tamiko Bellamy
(74) *Attorney, Agent, or Firm*—Reising, Ethington, Barnes, Kisselle, P.C.

(57) ABSTRACT

A method of calibrating a level sensor installed in an empty tank. In the tank, the level sensor includes a float that is allowed to rest against a first stop, such as the tank bottom or tank top. This position of the float is stored as a first level, such as a minimum level, in memory of sensor electronics of the level sensor. The float is thereafter moved, such as under the force of gravity by inverting the tank, against a second stop such as the tank top or the tank bottom. This position of the float is stored as a second level, such as a maximum level.

21 Claims, 1 Drawing Sheet

FUEL LEVEL SENSOR CALIBRATION

CROSS-REFERENCE TO RELATED APPLICATION

Applicants claim priority of German Patent Application, Ser. No. 10 2004 062 100.4, filed Dec. 23, 2004.

FIELD OF THE INVENTION

This invention relates generally to fuel level sensors and, more particularly, to calibration of fuel level sensors arranged in the fuel tank of a motor vehicle.

BACKGROUND OF THE INVENTION

Various types of fuel level sensors are used within fuel tanks to indicate a level of liquid fuel within the tank. One typical fuel level sensor includes a float attached to the end of a pivotable lever, which carries a wiper of a variable resistor. As the float and lever move in response to changes in liquid level, the wiper moves across a resistor card of the variable resistor to change the resistance of the variable resistor. Accordingly, the change in resistance effects a change in electrical signal output to a fuel gauge display. Another type of fuel level sensor may include a float connected to a sensor body by a rotatable lever attached at one end to the float and at an opposite end to a rotatable shaft. The rotatable shaft cooperates with an indicating means of the sensor body to effect a change in electrical signal output to a fuel gauge display.

With these types of fuel level sensors, the float generally floats on a surface of liquid fuel within a fuel tank and, thus, its vertical location within the tank corresponds to the level of liquid fuel. Accordingly, because the shaft, or wiper, is connected to the float via the pivotable lever, it assumes an angular position corresponding to the vertical location of the float. But it is necessary to calibrate the fuel level sensor to ensure precise correspondence between a sensed angular position of the shaft or wiper and the actual vertical location of the float. During calibration, the vertical location of the float and the angular position of the shaft or wiper are sensed at minimum and maximum levels.

From U.S. Pat. No. 5,485,740, it is known to measure the position of a float in an empty fuel tank and to store this float position in sensor electronics as a minimum level. Subsequently, the tank is completely filled with fuel, the float rises, and the resultant float position is stored in the sensor electronics as the maximum level. This calibration method, however, requires a significant amount of time to complete in waiting for the tank to fill.

SUMMARY OF THE INVENTION

A method of calibrating a fuel level sensor arranged in an empty fuel tank and including a float movable between a top and bottom of the empty fuel tank. The method includes allowing the float to rest against a first stop within the empty fuel tank, and thereafter storing the float position at the first stop as at least one of a minimum or maximum liquid fuel level. Subsequently, the float is moved in the empty fuel tank against a second stop substantially opposite the first stop and the float position at the second stop is stored as the other of the minimum or maximum liquid fuel level.

According to a preferred aspect of the method, the moving step includes inverting the empty fuel tank and allowing the float to rest against the second stop. According to another preferred aspect, the calibration is performed upon an initial startup of the level sensor, and is not performed again until a subsequent hardware reset is performed.

At least some of the objects, features and advantages that may be achieved by at least certain embodiments of the invention include providing a calibration method for fuel level sensors that is relatively quick, easy, and precise, does not require a fuel tank to be filled with liquid fuel before or during calibration, allows for calibration at minimum and maximum levels within the fuel tank, and results in operation of a fuel tank which is of relatively simple design and economical manufacture and assembly, rugged, durable, reliable and in service has a long useful life.

Of course, other objects, features and advantages will be apparent in view of this disclosure to those skilled in the art. Various other methods or fuel tanks embodying the invention may achieve more or less than the noted objects, features or advantages.

BRIEF DESCRIPTION OF THE DRAWINGS

These and other objects, features and advantages of the present invention will be apparent from the following detailed description of the preferred embodiment and best mode, appended claims, and accompanying drawings in which:

DETAILED DESCRIPTION OF THE PREFERRED EMBODIMENT

Figure 1:
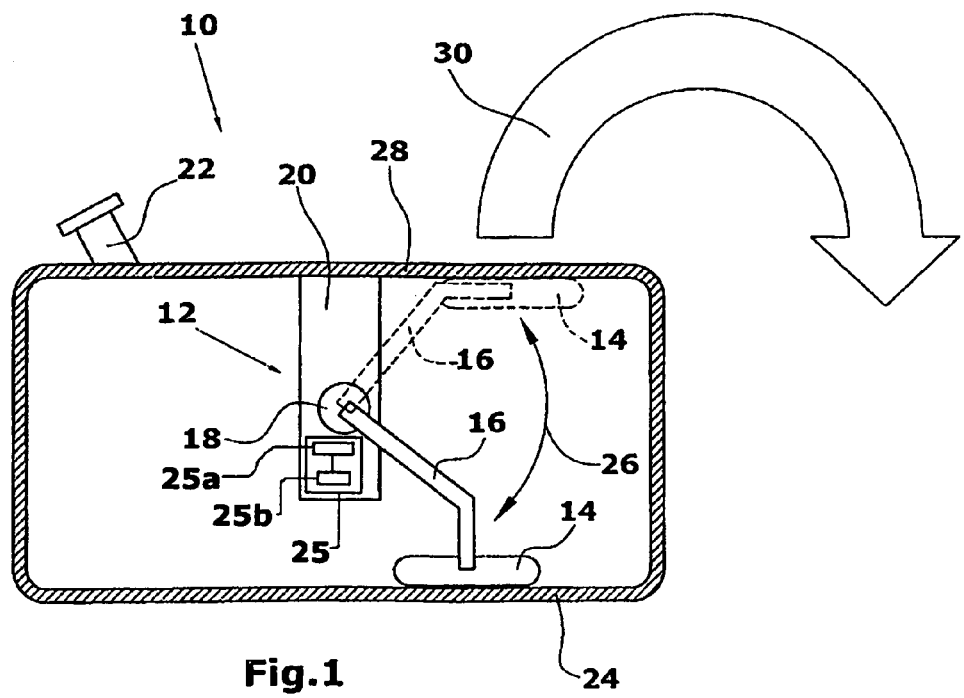
FIG. 1 illustrates a schematic sectional view of an exemplary embodiment of an empty and upright fuel tank with an installed fuel level sensor.

Referring in more detail to the drawings, FIG. 1 illustrates a fuel tank 10 including a fuel level sensor 12. The level sensor 12 includes a float 14 connected via a lever 16 to a rotating shaft 18, which is connected with a sensor body 20 carried in the tank 10. Further, the tank 10 comprises a fuel filler pipe 22, through which fuel can be filled into the tank 10.

Because no liquid fuel is present in the tank 10, the float 14 of the level sensor 12 is able to fall down against a tank bottom 24 such that the tank bottom 24 acts as a bottom stop for the float 14. The float 14 is preferably oblong in shape and is pivotally carried by the lever 16 so that the float 14 preferably lies on the tank bottom 24 across the entire width of the float. Thus, the vertical location of the float 14 and the angular position of the lever 16 and rotatable shaft 18 correspond to the minimum level of liquid in the tank 10. This minimum level position is stored as a first level or minimum level in sensor electronics 25 of the level sensor 12, such as in non-volatile electronic memory 25a of the sensor electronics 25. Those of ordinary skill in the art will recognize that the sensor electronics 25 may also include any suitable processor 25b in communication with the memory 25a and other computing devices to implement at least portions of the method described herein.

Subsequently, within the empty tank 10 the float 14 is moved towards a tank top 28 in the direction of arrow 26 until it contacts the tank top 28 (position shown in dashed lines). The angular position of the lever 16 and rotating shaft 18 corresponding to the vertical location of the float 14 is stored as a second level or maximum level in the sensor electronics of the level sensor 12.

Figure 2:
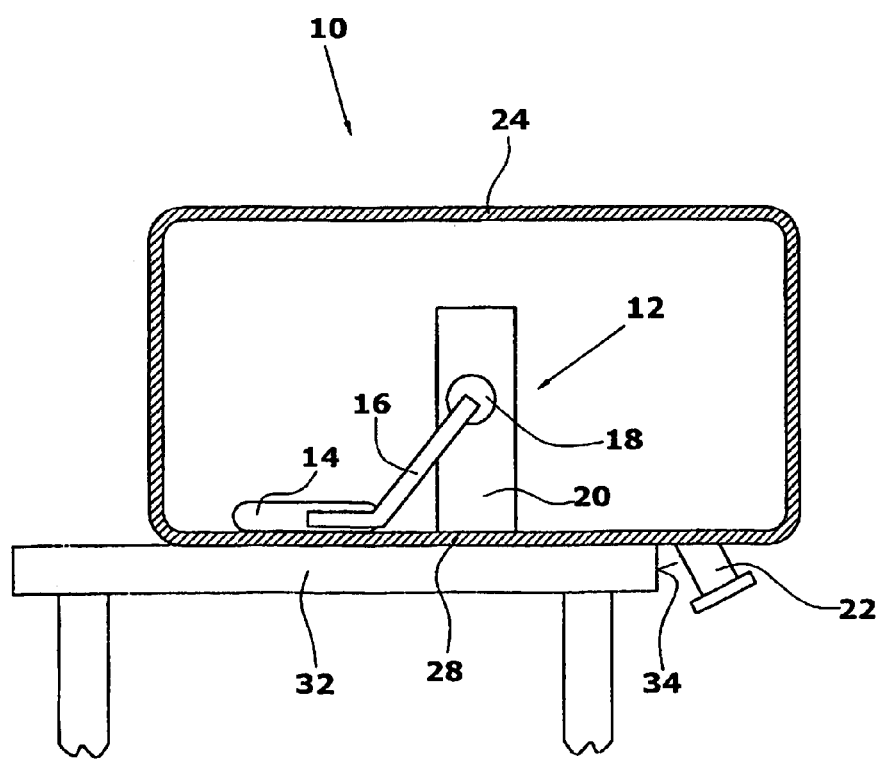
FIG. 2 illustrates a schematic sectional view of the fuel tank illustrated in FIG. 1 in an empty and inverted position.

Preferably, the tank 10 is inverted, or turned upside down, to move the float 14 within the empty tank 10 from the position corresponding to the minimum level into the position corresponding to the maximum level. In other words, the tank 10 including the level sensor 12 is turned in the direction of an arrow 30 before the maximum level is stored so that the tank top 28 is located at the bottom or lowest level, and so that the tank bottom 24 is located at the top or highest level (FIG. 2). In the inverted position of the tank 10 and under the force of gravity, the float 14 can fall down against the tank top 28 that is arranged at the lowest level. Inverting the tank 10 easily enables the position of the float 14 and the rotating shaft 18, respectively, to correspond to the maximum level of liquid in the tank 10.

Preferably, the tank bottom 24 and/or the tank top 28 are placed in the normal attitude or orientation they normally assume in a vehicle on a horizontal or level planar surface. Usually this is achieved by the tank bottom 24 and top 28 being substantially horizontally oriented before the minimum level and the maximum level are stored. Accordingly, any inaccuracies in measuring the minimum or maximum level are avoided so that the accuracy of the calibration is ensured. To ensure a horizontal orientation of the tank bottom 24 and/or the tank top 28, the tank 10 can be turned and located on a table 32, for example, so that the fuel filler pipe 22, which might otherwise hinder a horizontal orientation of the tank 10, is arranged next to a table edge 34.

Method

According to a preferred calibrating method, the level sensor 12 is arranged and used in the empty fuel tank 10 in such a manner that the float 14 of the level sensor 12 is disposed between the bottom 24 of the tank 10 and the top 28 of the tank 10. First, the calibrating method is initiated by, for example, starting the level sensor 12 by switching on an electric power source (not shown) that powers the level sensor 12, such as when a vehicle operator turns on a vehicle ignition switch (not shown). Second, the float 14 in the empty tank 10 falls in the downward direction by gravity until it hits a bottom stop which is preferably at the tank bottom 24. As an alternative, the float 14 may already be in contact with the bottom stop when the calibrating method is started. Third, after the float 14 has come into contact with the bottom stop and does not move any further, this float position is stored as the first or minimum level in a memory of the sensor electronics of the level sensor 12. Fourth, the float 14 in the empty tank 10 is moved toward the tank top 28 until the float 14 hits a top stop, which is preferably the tank top 28. Fifth, after the float 14 has come into contact with the top stop and does not move any further, this float position is stored as the second or maximum level by means of the memory of the sensor electronics.

It is also possible to reverse the order described above, by first measuring and storing the maximum level and then measuring and storing the minimum level. It is not absolutely necessary to determine the maximum level of liquid fuel within the empty tank. In other words, the calibration method may include just storing the minimum level.

Because calibration of the level sensor 12 is carried out after the level sensor 12 is installed in the tank 10, any deviations in the location of the level sensor 12 in the tank 10 can be compensated for, thereby resulting in precise calibration. For example, deviations in location of the level sensor 12 may be related to manufacturing and assembly tolerance variations in the dimensions of the various fuel tank components and in the assembly positioning of those fuel tank components. This also compensates for deviations and variations in the components and assembly of the fuel level sensor 12. Because the float 14 is moved in the tank 10 while the tank 10 is empty, no time is required to fill the tank 10 with liquid, discharge the liquid, and clean the tank 10. Thus, the calibration of the level sensor 12 can be carried out quickly.

Preferably, the calibration of the level sensor 12 is performed once, such as when the level sensor 12 is started for the first time. For example, when the level sensor 12 is supplied with electric power for the first time and/or no values are yet stored for the minimum and maximum levels in the memory of the sensor electronics. Preferably, the level sensor 12 is automatically brought into a calibration state when it is switched on for the first time. Because the method is automatically initiated upon initial startup of the level sensor 12, no external independent triggering command to start the calibration is required. In other words, the calibration method is internalized to the level sensor 12 and, thus, there is no need for an external communication cable or corresponding openings in the level sensor 12 or in the fuel tank 10. This reduces the risk of leakage occurring at a connection point from the interior of the tank 10 to the outside. Further, the level sensor mounting requirements are reduced because no sealing measures are required for a communication cable connection.

To automatically measure the minimum level and the maximum level from outside the tank 10 without any control cables or other control measures, the level sensor 12 preferably includes calibrating electronics (not shown) as part of its sensor electronics, which is preferably arranged completely within the tank 10. Using the calibrating electronics, the float position is detected as either the minimum level or the maximum level when the float position is immobile for a predetermined time, such as for three seconds. The other level, either the maximum level or the minimum level, is thereafter detected when, for example, the respective float position has moved from the former detected float position by a predetermined minimum distance and has also been immobile for a predetermined time.

After both the minimum level and the maximum level have been stored, a subsequent startup of the level sensor 12 does not result in the calibration method being carried out. Rather, subsequent startups of the level sensor 12 result in the level of the fuel in the fuel tank 10 being measured, taking into consideration the previously measured and stored minimum and maximum levels.

The calibrating method is only performed again after a reset operation, wherein the level sensor 12 is removed from the tank 10 and mechanically and/or electrically reset into a pre-calibration state. For example, the level sensor 12 may be reset by erasing the stored values for the minimum level and the maximum level. Typically, a motor vehicle fuel tank includes a mounting hole for the installation of a fuel pump module in the tank. Such a mounting hole may be used to access the fuel level sensor to carry out such a reset.

Preferably, the float 14 in the empty tank 10 is moved towards the tank top 28 by inverting the empty tank 10 (including the installed level sensor 12) in such a manner that the tank top 28 is located at the bottom or lowest level and the tank bottom 24 is located at the top or highest level after the tank 10 has been inverted. The tank 10 is preferably inverted automatically by means of a rotatable gripping means or handling device. Thereafter, the float 14 can fall toward the tank top 28 due to gravity. In this manner, the float 14 or rotating shaft 18 need not be externally actuated such as by a releasably connected lever (not shown) so that the calibration of the level sensor 12 is particularly simple.

Alternatively, however, the tank 10 need not be inverted. Instead, the float 14 may be manually moved within the empty tank 10, from the bottom of the tank 10 toward the tank top 28. More specifically, the rotating shaft 18 of the level sensor 12 may be rotated by means of a lever (not shown), which can be releasably connected to the rotating shaft 18 for manually moving the float 14 between the top and bottom of the tank 10 during calibration. After the level sensor 12 has been calibrated, the releasably connected lever can be removed from the rotating shaft 18 whereafter the shaft 18 can be connected with an indicating means (not shown) of the level sensor 12 for indicating the level of liquid in the tank 10.

In another form of the invention, it is also possible to calibrate the level sensor 12 without any lever. For example, a contactless fuel level sensor (not shown) may be used and may include an electrical circuit, an elongated housing or tube surrounding the electrical circuit, and a float assembly. The electrical circuit is elongated, extends in a vertical direction, and has a plurality of series connected resistors and a plurality of magnetically activated switches. The switches are located at various axial positions along the electrical circuit and are connected between two of the resistors at one end and a common node at the other end. The float assembly includes at least one magnet and surrounds a segment of the housing such that the float assembly is capable of freely rotating about the housing and vertically moving along the housing according to the fuel level in the fuel tank. Further, the magnet is oriented such that it is capable of activating each of the switches from any angular orientation of the float assembly relative to the housing. Accordingly, the calibration of such a level sensor within the empty tank is particularly simple because no external tools, levers, or test liquid is required.

Preferably, the liquid level values between the minimum level and the maximum level are determined by means of a predetermined fuel level formula, curve, look up table, or the like. The predetermined fuel level formula or look up table is preferably stored in the memory of the sensor electronics and may be empirically determined or calculated for each particular tank application. The fuel level formula or look up table is preferably determined by gauging the volumetric capacity of the fuel tank 10 in liters, gallons or the like. Thus, it is possible to use fuel tanks with irregular geometrical shapes and nonetheless ensure an exact measurement of the liquid fuel level. But if a special level formula or table is not stored in the memory of the sensor electronics, then liquid level values between the minimum level and the maximum level may otherwise be interpolated therebetween, extrapolated beyond other known levels, or some combination of such interpolation and extrapolation, or the like.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components, elements, or items. Moreover, directional words such as top, bottom, upper, lower, radial, circumferential, axial, lateral, longitudinal, vertical, horizontal, and the like are employed by way of description and not limitation. Other terms are to be construed using their broadest reasonable meaning unless they are used in a context that requires a different interpretation. When introducing elements of the present invention or the embodiments thereof, the articles "a," "an," "the," and "said" are intended to mean that there are one or more of the elements.

It is to be understood that the invention is not limited to the particular exemplary embodiments disclosed herein, but rather is defined by the following claims. In other words, the statements contained in the foregoing description relate to particular exemplary embodiments and are not to be construed as limitations on the scope of the invention as claimed below or on the definition of terms used in the claims, except where a term or phrase is expressly defined above.

Although the present invention has been disclosed in conjunction with a limited number of presently preferred exemplary embodiments, many others are possible and it is not intended herein to mention all of the possible equivalent forms and ramifications of the present invention. Other modifications, variations, forms, ramifications, substitutions, and/or equivalents will become apparent or readily suggest themselves to persons of ordinary skill in the art in view of the foregoing description. In other words, the teachings of the present invention encompass many reasonable substitutions or equivalents of limitations recited in the following claims. As just one example, the disclosed structure, materials, sizes, shapes, and the like could be readily modified or substituted with other similar structure, materials, sizes, shapes, and the like. In another example, the invention has been disclosed in conjunction with a fuel tank and fuel level sensor. However, additional applications are contemplated for the calibration method, such as hydraulic tanks, oil tanks, fuel additive tanks, or any other applications where it is desirable to use a liquid level sensor, and can be provided without departing from the disclosure. Indeed, the present invention is intended to embrace all such forms, ramifications, modifications, variations, substitutions, and/or equivalents as fall within the spirit and broad scope of the following claims.

What is claimed is:

1. A method of calibrating a fuel level sensor installed in an empty fuel tank and including a float received between a top and bottom of the empty fuel tank, comprising the steps of:
   installing in an empty fuel tank a fuel level sensor producing an electric signal response to the position of a float of the sensor in the fuel tank;
   while the tank is empty allowing the float to rest against a first float stop within the empty fuel tank in the tank;
   while the tank is empty storing the electric signal of the installed sensor with the float position at the first stop while the tank is empty as indicative of at least one of a minimum or maximum liquid fuel level in the tank;
   while the tank is empty moving the float of the installed sensor in the empty fuel tank against a second stop substantially spaced from and generally opposite the first stop; and
   while the tank is empty storing the electric signal of the installed sensor with the float position at the second float stop while the tank is empty as indicative of the other of the minimum or maximum liquid fuel level in the tank.

2. The method of claim 1, wherein the first stop is at a bottom of the empty fuel tank and corresponds to the minimum level.

3. The method of claim 2, wherein the second stop is at a top of the empty fuel tank and corresponds to the maximum level.

4. The method of claim 1, wherein the moving step includes inverting the empty fuel tank and allowing the float to rest against the second stop, the step of storing the float position at the first stop is carried out after the float has been immobile for a predetermined period of time, and the step of storing the float position at the second stop is carried out after the float has moved from the first stop over a predetermined minimum distance and has been immobile for a predetermined period of time.

5. The method of claim 1, wherein the calibration is performed upon an initial startup of the level sensor until a subsequent hardware reset is performed.

6. The method of claim 1, wherein the storing steps are carried out by storing the float positions using memory of sensor electronics.

7. The method of claim 6, wherein the sensor electronics includes calibrating electronics, wherein the calibrating electronics and the memory are received within the fuel tank.

8. The method of claim 1, wherein the step of storing the float position at the first stop is carried out after the float has been immobile for a predetermined period of time.

9. The method of claim 8, wherein the step of storing the float position at the second stop is carried out after the float has moved from the first stop over a predetermined minimum distance and has been immobile for a predetermined period of time.

10. The method of claim 1, wherein the moving step includes inverting the empty fuel tank and allowing the float to rest against the second stop.

11. The method of claim 10, wherein the moving step includes automatically inverting the empty fuel tank by a rotatable handling device.

12. The method of claim 1, wherein the first stop is the bottom of the empty fuel tank and the second stop is the top of the empty fuel tank.

13. The method of claim 1, wherein at least one of the bottom of the fuel tank or the top of the fuel tank is oriented substantially horizontally before the respective storing steps are carried out.

14. The method of claim 1, wherein the level sensor includes a rotatable shaft connected to the float and rotatable by a removable lever during the moving step.

15. The method of claim 1, wherein level values between the minimum and maximum levels are determined using at least one of a level formula or look up table for the fuel tank and stored in memory of the sensor electronics.

16. A method of calibrating a fuel level sensor installed in an empty fuel tank and including a float received between a top and bottom of the empty fuel tank, comprising the steps of:

installing in an empty fuel tank a fuel level sensor producing an electric signal response to the position of a float of the sensor in the fuel tank;

while the tank is empty initially starting the level sensor;

while the tank is empty allowing the float of the installed level sensor to rest against a first float stop in the empty fuel tank;

while the tank is empty storing the electric signal of the installed level sensor with the float position at the first stop while the tank is empty as indicative of a minimum fuel level in a memory of sensor electronics;

while the tank is empty inverting the empty fuel tank and allowing the float of the installed level sensor to rest against a second stop spaced apart from and generally opposite the first stop; and while the tank is empty storing the electric signal of the installed level sensor with the float position at the second float stop while the tank is empty as indicative of a maximum fuel level in a memory of sensor electronics.

17. A method of calibrating a fuel level sensor installed in an empty fuel tank and including a float received between a top and bottom of the empty fuel tank, comprising the steps of:

installing in an empty fuel tank a fuel level sensor producing an electric signal response to the position of a float of the sensor in the fuel tank;

while the tank is empty initially starting the installed level sensor;

while the tank is empty allowing the float to rest against the bottom of the empty fuel tank;

while the tank is empty storing in a memory of sensor electronics the electric signal of the installed sensor with the float position at the first float stop while the tank is empty as indicative of a minimum fuel level in the tank;

while the tank is empty inverting the empty fuel tank and allowing the float of the installed sensor to rest against the top of the empty fuel tank; and while the tank is empty storing in a memory of sensor electronics the electric signal of the installed sensor with the float position at the second float stop while the tank is empty as indicative of a maximum fuel level in the tank.

18. The method of claim 17, wherein at least one of the bottom of the tank or the top of the fuel tank is oriented substantially horizontally before the storing steps are carried out.

19. The method of claim 17, further wherein fuel level values between the minimum and maximum fuel levels are determined using at least one of a fuel level formula or a look up table for the fuel tank and stored in memory of the sensor electronics.

20. The method of claim 17, wherein the step of storing the float position at the first stop is carried out after the float has been immobile for a predetermined period of time, and the step of storing the float position at the second stop is carried out after the float has moved from the first stop over a predetermined minimum distance and has been immobile for a predetermined period of time.

21. A method of calibrating a fuel level sensor installed in an empty fuel tank and including a float received therein wherein the float is connected to a sensor body including sensor electronics by a rotatable lever attached at one end to the float and at an opposite end to a rotatable shaft, which cooperates with an indicating means of the sensor body to effect a change in electrical signal output, comprising the steps of:

installing in an empty fuel tank a fuel level sensor producing an electric signal response to the position of a float of the sensor in the fuel tank;

while the tank is empty allowing the float of the installed level sensor to rest against a first float stop within the empty fuel tank corresponding to at least one of a minimum or maximum fuel level in the fuel tank;

while the tank is empty storing the electric signal of the installed level sensor with the float position at the first stop while the tank is empty as indicative of at least one of a minimum or maximum liquid fuel level by storing the corresponding electrical signal output in the sensor electronics;

while the tank is empty moving the float of the installed level sensor in the empty fuel tank against a second float stop substantially spaced from and generally opposite the first stop; and while the tank is empty storing the electric signal of the installed level sensor with the float position at the second stop while the tank is empty as indicative of the other of the minimum or maximum liquid fuel level by storing the corresponding electrical signal output in the sensor electronics.

* * * * *